Jan. 31, 1967 P. H. TOPE 3,301,449

MULTI-PURPOSE CAR TOP LUGGAGE CARRIER

Filed Nov. 19, 1965 2 Sheets-Sheet 1

INVENTOR
PAUL H. TOPE

BY *Francis L. Snyder* AGENT

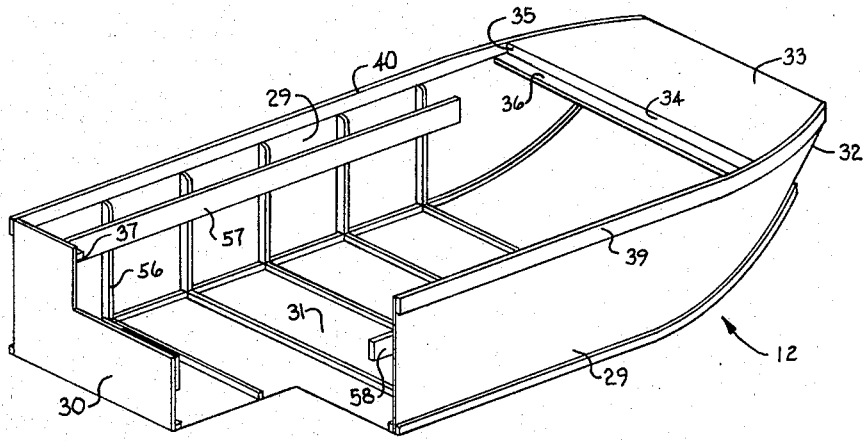
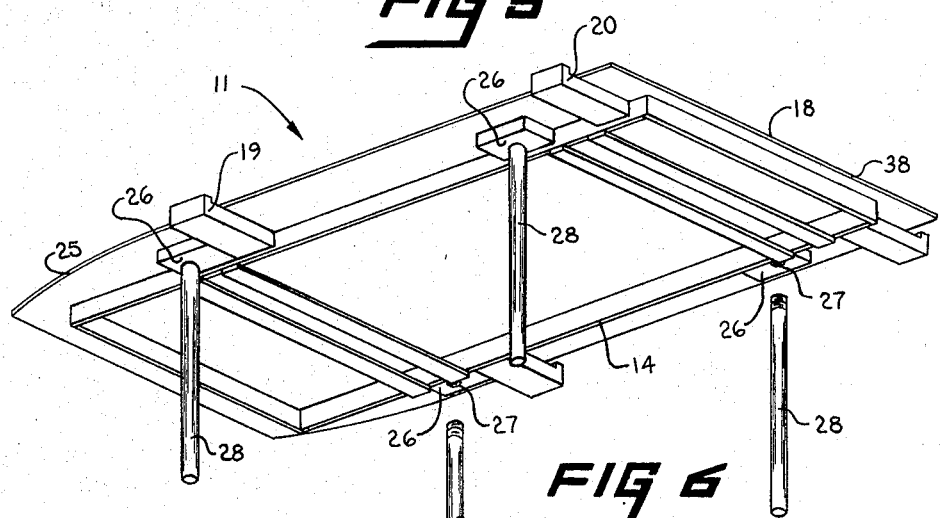
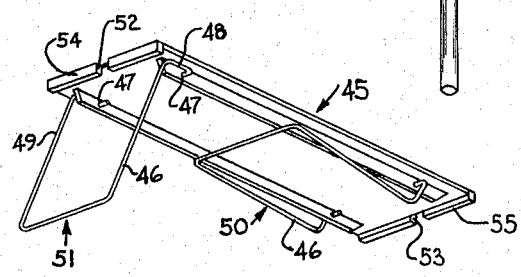

United States Patent Office 3,301,449
Patented Jan. 31, 1967

3,301,449
MULTI-PURPOSE CAR TOP LUGGAGE CARRIER
Paul H. Tope, 724 Aurilla Drive,
St. Joseph, Mich. 49085
Filed Nov. 19, 1965, Ser. No. 508,817
8 Claims. (Cl. 224—42.01)

This invention relates to a multi-purpose car top luggage carrier and more specifically to improvements in apparatus for combining a picnic table and a boat to form a car top luggage carrier.

The instant invention employs a pair of conventional car top carrier base bars which are anchored to the top of an automobile and have attached to the bars a picnic table which forms a luggage platform for transport of luggage, and a boat arrangement which forms the cover for the luggage platform.

Space is at a premium when traveling, if one car is being used. The storage of luggage is always a problem in that the trunk space in an automobile is limited at best. Therefore, it is one of the objects of this invention to provide an additional area for storage on an automobile while being able to transport facilities for recreational purposes.

Another object of this invention is to provide an improved car top luggage carrier wherein the luggage carrier itself can be used for purposes other than luggage transport.

Another object of this invention is to provide, in combination, a picnic table-luggage platform and luggage platform cover-boat.

A feature of the invention resides in the compact storage and easy access to the luggage while being able to use the luggage platform cover independently for boating purposes and the luggage platform independently for a picnic table.

A further feature of the invention resides in the interchangeability of the boat seats whereby these seats may be used as seats for the picnic table as well as boat seats.

Other features and advantages of the invention will be obtained from the following description taken in connection with the accompanying drawings herein in which:

FIGURE 5 is a perspective view of the cover or boat removed from the luggage platform;

FIGURE 6 is a perspective view of the luggage platform or table removed from the car top carrier bars; and FIGURE 7 is a perspective view of the convertible boat seat-picnic table seat.

Figure 1:
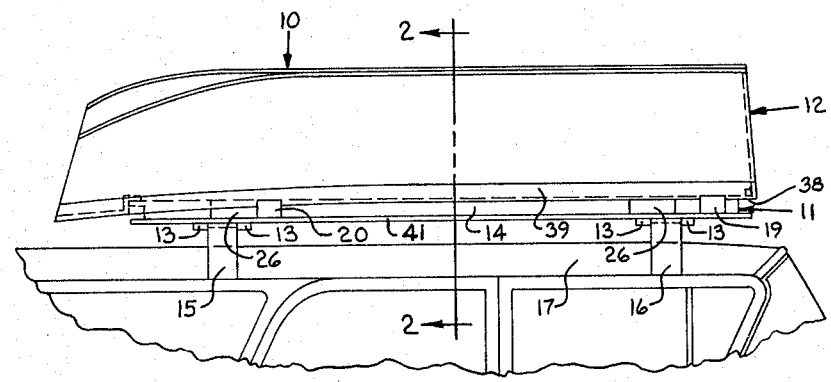
FIGURE 1 is a longitudinal elevational view embodying the invention.

In the exemplary embodiment of the invention as disclosed in the drawings, the multi-purpose car top luggage carrier generally designated as 10 is shown to comprise a combination luggage platform and picnic table 11, and a combination luggage platform cover and boat 12.

The luggage platform or picnic table 11 comprises a frame portion 14 having elongate members 13 on the bottom thereof. These elongate members 13 straddle car top carrier bars 15 and 16 which are anchored to the car top 17. The elongate members 13 prevent movement of the frame 14 and platform top 18 which is fixedly connected to frame portion 14 from sliding forwardly or rearwardly. Platform top 18 is connected to frame 14 by conventional means. Support means 19 and 20 are also attached to platform top 18 by conventional means and extend outwardly from the edges 21 and 22 of the platform top 18. These support means have upwardly extending flanges 23 and 24. The platform top 18 is formed at its one end 25 (FIGURE 6) to receive the shape of luggage platform cover or boat 12. Referring to FIGURE 6 block means 26 are attached to frame portion 14 and have threaded openings 27. A threaded conduit such as shown at 28 can be threaded into the blocks 26 to serve as legs for the luggage platform. The luggage platform when removed from the car top carrier bars 15 and 16, and fitted with conduits 28 can be used as a conventional picnic table.

Figure 4:
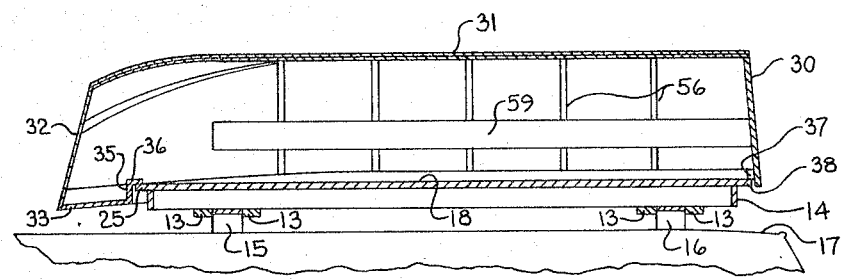
FIGURE 4 is a longitudinal sectional view taken along lines 4—4 of FIGURE 3.

Boat or luggage platform cover 12 has the conventional side portions 29, rear portion 30 and bottom portion 31. This particular arrangement discloses a square-nosed boat which has an additional end portion 32. A support deck 33 is connected between side portions 29 and end portion 32. The rear edge 34 of the deck 33 has a downwardly extending flange 35 to which is connected an outwardly extending flange 36. As can be seen in FIGURE 4, flanges 35 and 36 cooperate with the top surface of platform top 18 to support boat 12 at end 25 of the luggage platform top 18. An elongate member 37 is attached to end wall 30 by conventional means and acts to support boat 12 on end 38 of luggage platform 18. Boat 12 also has edges 39 and 40 which telescope over the edges of luggage platform top 18 and cooperate with support means 19 and 20. The various support means bear the entire weight of the boat or luggage platform cover 12 which provides the cover for the luggage platform 11. Boat edges 39 and 40, rear portion 30 and flange 35 all telescope over the outside edges of luggage platform top 18 to form a drip lip which prevents water from entering the area between the boat or luggage platform cover 12 and the luggage platform 11.

Figure 2:
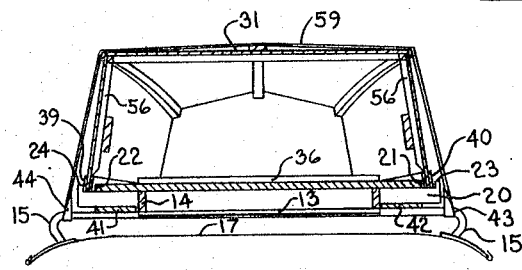
FIGURE 2 is an enlarged cross sectional view taken substantially along line 2—2 of FIGURE 1.
Figure 3:
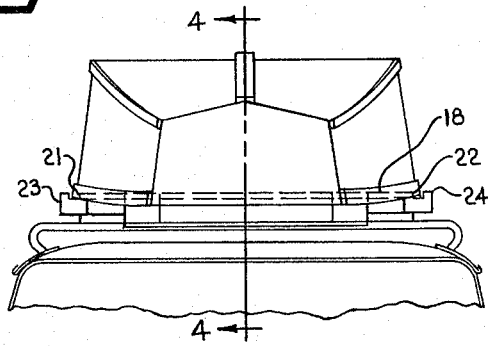
FIGURE 3 is a left end elevational view thereof.

Referring to FIGURE 2, anchor members 41 and 42 are secured by conventional means to car top carrier bars 15 and 16, and are spaced apart so as to allow the platform frame 14 to nest between them. These anchor members 41 and 42 prevent the platform 18 from sliding sideways with respect to the length of the car when any force is applied in the cross direction. As was discussed earlier, members 13 prevent sliding of platform portion 11 forward or backward on the car top 17. Anchor members 41 and 42 are also externally dimensioned and shaped similar to platform top 18 to permit positive sideways and forward-backward anchoring of boat 12 to car top carrier bars 15 and 16 when the luggage platform 11 is not installed on the car top carrier bars 15 and 16.

Conventional means can be used to secure the boat portion 12 and/or luggage platform 11 to car top carrier bars 15 and 16. An example of a conventional tie-down would be a webbed belt arrangement 59 which could be anchored to luggage top carrier bars 15 and 16 at 43 and thrown over the boat portion and anchored tightly at 44. This arrangement functions with or without the luggage platform 11, and allows for easy access to the interior of the car top luggage carrier, or for complete disassembly of the combination boat and luggage platform.

Referring to FIGURE 2, when access is desired to the interior of luggage carrier 10, such as for loading or unloading, web belt 59 is loosened at 44 and edge 39 of cover 12 is raised to a height necessary for access. Edge 40 of cover 12 pivots on support means 19 and 20. A prop (not shown) can be used to hold edge 39 of cover 12 in the access position until loading or unloading is completed. It should also be understood that edge 40 may be raised for access instead of edge 39, if desired.

Referring to FIGURE 7, a plurality of seats 45 are primarily used in the boat 12 but are designed to be readily removed from boat 12 to provide the maximum luggage storage space and to function as independent free standing seats. Legs 46 pivot at 47 and have an outwardly extending portion 48 and a U-shape portion 49 at an obtuse angle to extending portion 48. When the seats 45 are being used as boat seats, these legs swing into the position shown at 50. When the seats are being used independently or in combination with the picnic table, they pivot into a position as shown at 51. Seats 45 are dimensioned to fit between ribs 56 and have slots 52 and 53 at each of ends 54 and 55 which cooperate with ribs 56 (FIGURE 5) and support members 57 and 58 in boat 12. This construction permits various seat positions and assures that the seats cannot slide when in use in boat 12. Also, the seats 45 when in place in boat 12 act as structural members to give rigidity to boat 12.

Having described my invention as related to the embodiment shown in the accompanying drawings, it is my intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

1. A vehicle top mounted multi-purpose luggage carrier arrangement, comprising: base means having stop members attached thereto, said base means being attached to said vehicle top; platform means removably mounted on said base means between said stop members, said platform means including frame means, a horizontal platform top member and leg means, said frame means extending downwardly from said platform top member, and said leg means defining threaded block means depending downwardly from said platform top member and threaded conduit means for attaching to said block means whereby said platform means may be used independently as a table; elongate members fixedly attached to said platform means and positioned adjacent said base means, said elongate means and said stop members preventing relative movement between said platform means and said base means; flange means extending outwardly and upwardly from said platform means; and cover means having edge members depending on said flange means, said cover means and said platform means defining a chamber therebetween for storage of luggage and the like.

2. The luggage carrier arrangement of claim 1 wherein said cover means comprises a water craft for use with said platform means or independently for water sport.

3. The luggage carrier arrangement of claim 2 wherein said water craft is positioned on said flange members in its upside-down position, said water craft being capable of being pivoted about said flange member for access to said chamber.

4. The luggage carrier arrangement of claim 2 wherein cover means includes interconnected structural members.

5. The luggage carrier arrangement of claim 4 wherein seat means cooperate with said structural members to provide rigidity to said cover means during use as a water craft and are removable for maximum storage space when said cover means is placed in cooperation with said platform means during use as a luggage carrier cover means.

6. The luggage carrier arrangement of claim 4 wherein seat means are selectively positioned in cooperation with said structural members for distributing the weight in said cover means when said cover means is used as a water craft.

7. The luggage carrier arrangement of claim 1 wherein said cover means comprises a water craft having seat means, said seat means being removable for use with said platform means when said platform means is used independently as a table.

8. The luggage carrier arrangement of claim 7 wherein said seat means includes a horizontal seat member and pivotal leg members operatively connected to said seat member whereby said leg members pivotally collapse beneath said seat member during use with said water craft, and pivotally extend from said seat member during use with said table.

References Cited by the Examiner

UNITED STATES PATENTS

| | | | |
|---|---|---|---|
| 2,684,796 | 7/1954 | Swenson | 224—42.1 |
| 2,948,576 | 8/1960 | Ball | 224—42.1 X |
| 3,145,889 | 8/1964 | Altman et al. | 224—42.01 X |

GERALD M. FORLENZA, *Primary Examiner.*

F. E. WERNER, *Assistant Examiner.*